April 22, 1952          W. BOYD          2,594,118
HEATED INTAKE COMPONENT FOR GAS TURBINE ENGINES
Filed April 7, 1949          3 Sheets-Sheet 1
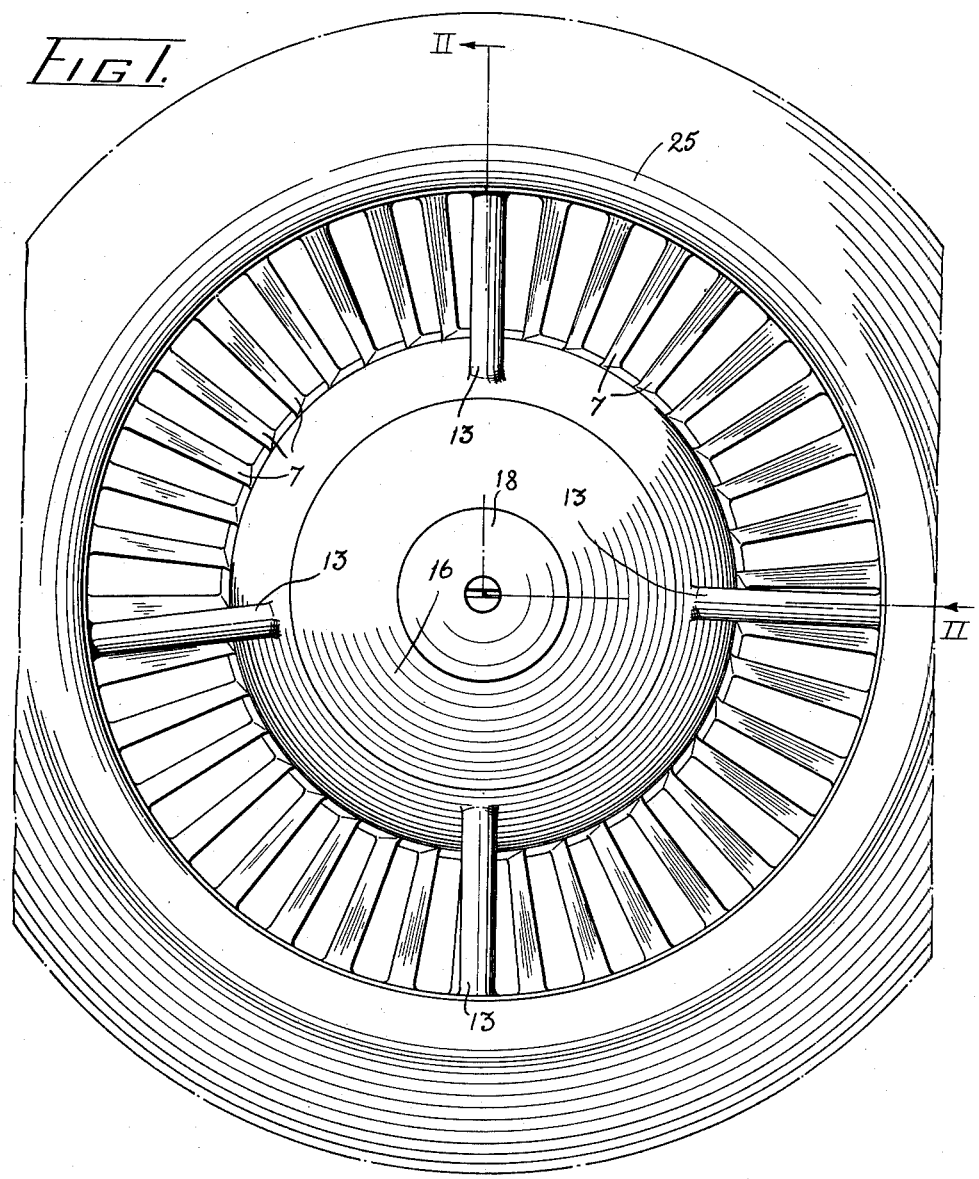
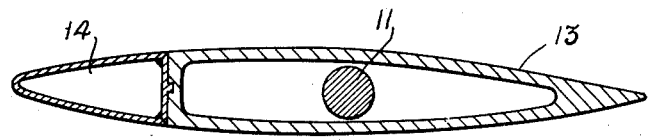
INVENTOR
WINNETT BOYD.
By
ATTORNEY.

INVENTOR
WINNETT BOYD.
By
ATTORNEY

April 22, 1952          W. BOYD          2,594,118

HEATED INTAKE COMPONENT FOR GAS TURBINE ENGINES

Filed April 7, 1949          3 Sheets-Sheet 3

INVENTOR
WINNETT BOYD.

By

ATTORNEY.

Patented Apr. 22, 1952

2,594,118

UNITED STATES PATENT OFFICE 2,594,118

HEATED INTAKE COMPONENT FOR GAS TURBINE ENGINES

Winnett Boyd, Bobcaygeon, Ontario, Canada, assignor to A. V. Roe Canada Limited, Malton, Ontario, Canada, a corporation Application April 7, 1949, Serial No. 86,057

6 Claims. (Cl. 244—134)

This invention relates to means for preventing the formation of ice on aircraft surfaces, and more particularly to means for preventing ice formation of the air intake components of air compressors which are associated with aircraft gas turbine engines.

The application of gas turbine engines to aircraft has introduced a serious icing problem in view of the particular vulnerability of gas turbine engines to ice formation. The formation of ice on such intake components as the intake fairing, the nose bullet, and the struts supporting the front bearing, causes serious obstruction to the flow of air passing into the compressor and considerable damage may result from pieces of ice breaking loose and being carried by the air stream into the rotating parts. These hazards can be avoided either by the introduction of a fluid such as alcohol to lower the freezing point of the mixture coming into contact with the components, or by the application of heat to raise the surface temperature of the inlet parts above the freezing point of water. The chief objections to the former method lie in the complications involved in the fluid supply system and the fact that for reasons of weight, only sufficient fluid can be carried to enable the system to function intermittently and the system therefore cannot be turned on until icing conditions have been detected, by which time some ice will have already formed. The second method, involving application of heat, can be employed in a number of ways but care must be taken to avoid an excessive heating of the bulk of the air passing into the compressor, since this would materially impair the compressor performance, and furthermore, it is necessary to avoid complicating the heating installation as far as possible.

Means have been devised heretofore for utilizing hot gases to prevent the formation of ice on the components of aircraft having internal combustion engines, but such means are not adapted for use on the intake components of aircraft gas turbine engines.

The object of this invention therefore is to provide a method of heating the intake components of compressors for aircraft gas turbine engines which will be relatively simple to apply and will use some of the heat which is inevitably wasted to the atmosphere in the normal course of operation of the engine, rather than electrical or other forms of heat which require to be generated specifically for anti-icing purposes. Another object of this invention is to avoid any appreciable heating of the charge of air entering the compressor and to provide a ready means for the application of heat where it is most required.

All of the foregoing and still further objects and advantages of the invention will become apparent from a study of the following specification, taken in conjunction with the accompanying drawings wherein like characters of reference indicate corresponding parts throughout the several views and wherein:

Fig. 1 is a front elevation, partly broken away, of the air intake of the air compressor of a gas turbine constructed in accordance with this invention;

Fig. 3 is a cross-section of a strut on the line III—III of Fig. 2; and

Figure 2:
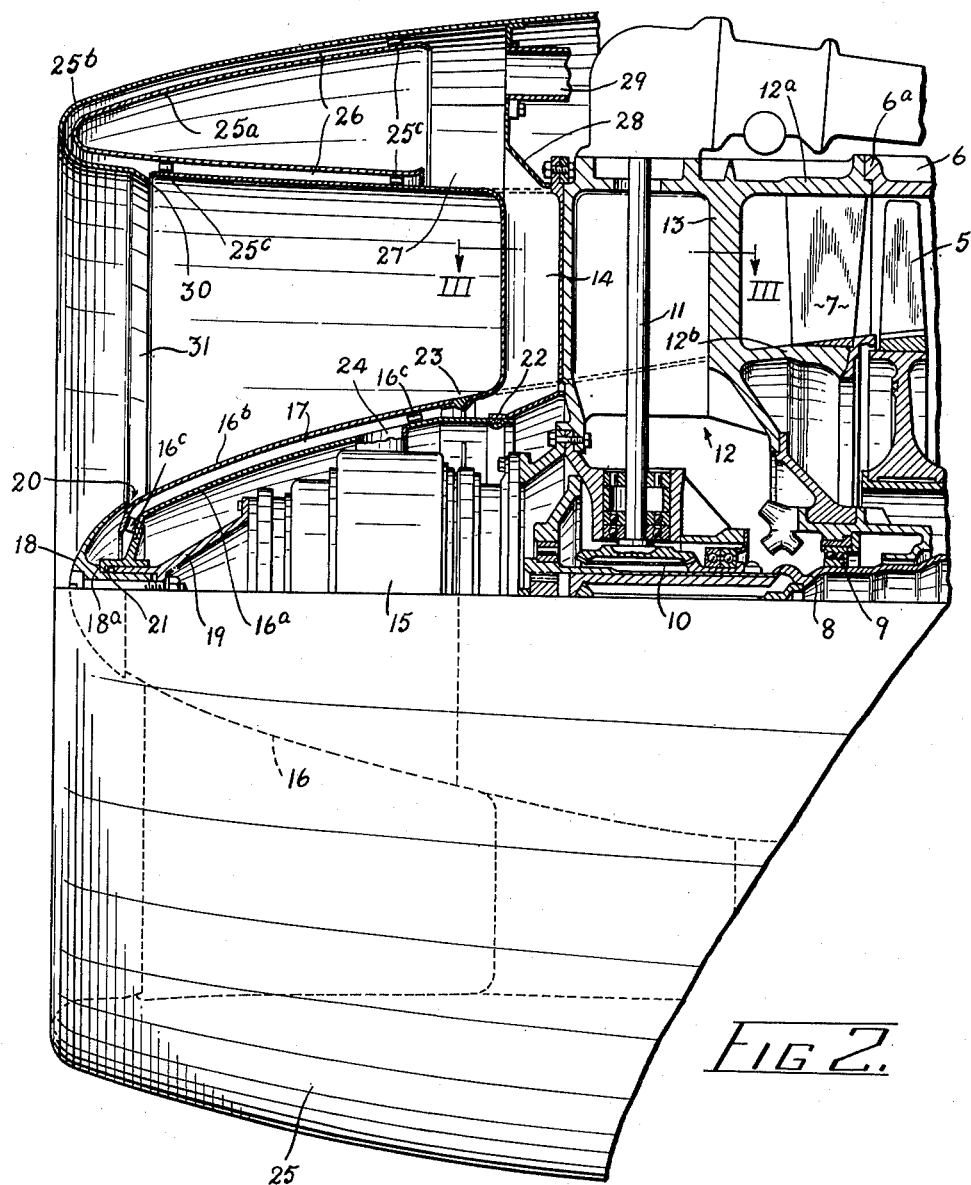
Fig. 2 is an elevation, partly in section on the line II—II of Fig. 1.
Figure 4:
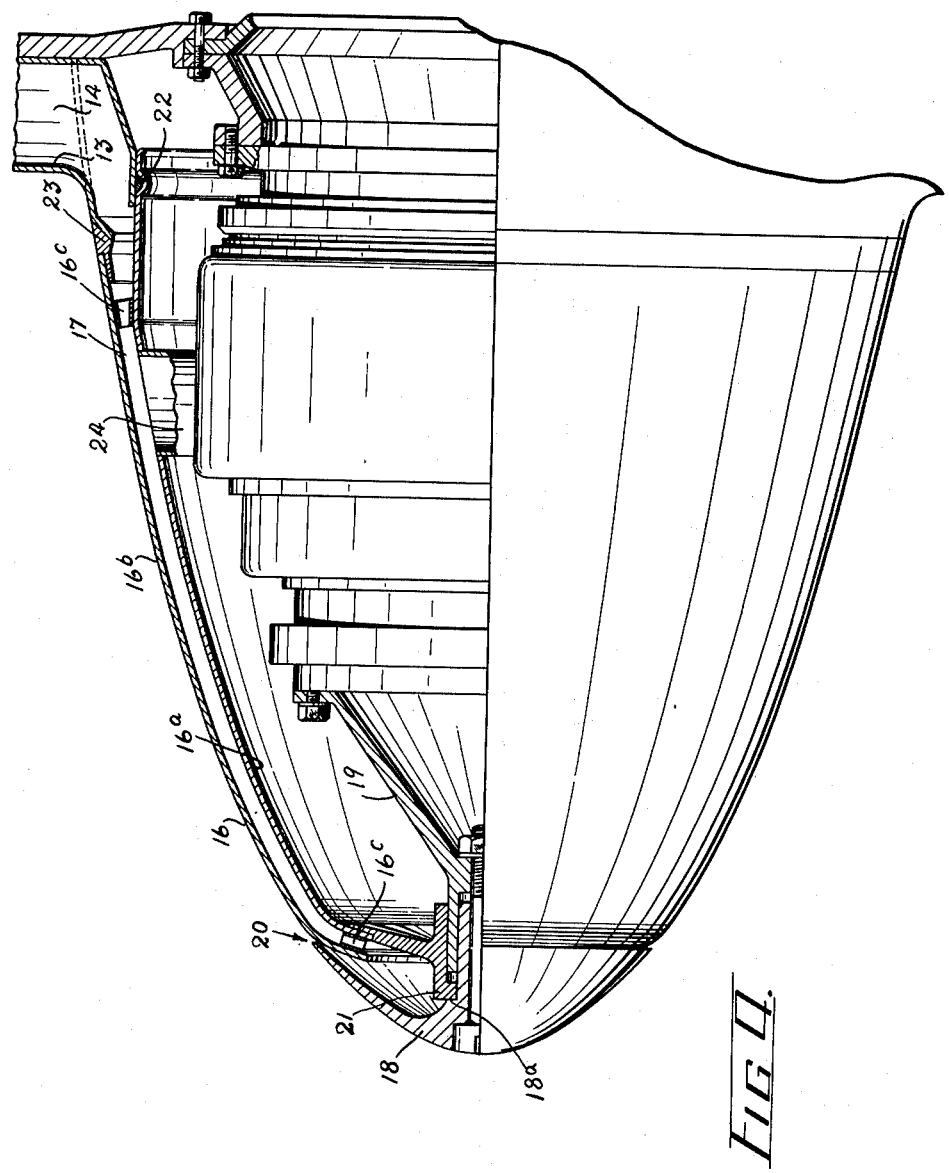
Fig. 4 is an elevation partly in section to an enlarged scale showing the nose bullet and cap assembly.

In the compressor assembly the first stage of rotor blades 5 are mounted within a stator casing 6. Immediately forward of the rotor blades are the inlet guide vanes 7. The rotor shaft 8 having a front bearing 9 is linked by gearing 10 to an auxiliary drive 11 and housed in an intake structure 12 which is composed of an outer portion 12$^a$, an inner portion 12$^b$ and interconnecting struts 13, the whole being fastened to the outer stator casing 6 at the flange 6$^a$. Struts 13 are arranged in cruciform and may vary from 3 in number upward to 8 in number or even more. The struts 13 each have a hollow leading edge member 14 secured thereto. The leading edge members 14 form enclosed conduits for the flow of heated air.

On the front of the casing 12 are mounted the engine starter 15 and a detachable central or inner intake fairing or nose bullet 16. The nose bullet 16 is constructed with a double skin constituted by an inner or baffle wall 16$^a$ and an outer or duct wall 16$^b$ spaced by the webbing 16$^c$. The circulation passage 17 provided between the baffle wall and the duct wall is in communication with the conduits 14 formed in the leading edges of struts 13, so that a heating medium may be carried into the passage 17 from the conduits 14. The nose bullet is held in place by a cap 18 which overlaps the duct wall 16$^b$ and which is bolted to a bracket 19 mounted on the front of the starter 15. The outer edge of the cap 18 is spaced from the duct wall 16$^b$ of the nose bullet so as to provide an annular outlet 20 between the said cap and the duct wall. The cap 18 has a shoulder 18ª which engages an annular flange 21 secured to the baffle wall 16ª of the nose bullet 16, thereby sealing off the passage 17 from communication with the interior of the nose bullet 16. By tightening the cap 18 against the flange 21, the baffle wall 16ª and the duct walls 16ᵇ of the nose bullet are caused to bear against the O-ring type seal 22 and the cone seat 23, respectively, provided on the face of the intake structure 12ᵇ. When access to the starter is required, the nose bullet 16 may be readily removed by unscrewing the cap 18 and withdrawing the nose bullet from contact with the seal 22 and the seat 23.

It may be noted that if the starter employed is of a type requiring an exhaust outlet, the double wall of the nose bullet 16 may be used for this purpose. A duct 24, which will be required only for this type of starter, is provided to connect the starter to the circulation passage 17.

Spaced from the nose bullet 16 is an annular outer intake fairing 25 extending forwardly from an annular bulkhead which is coaxial with the compressor and defines with the central or inner intake fairing or nose bullet 16 an annular duct through which air enters the compressor. The annular fairing 25 includes a hollow annular fairing shell 25ᵇ provided by a distal or peripheral cowling wall and an intake wall, which converge towards each other and curve and blend into each other at the front. Within the annular fairing shell 25ᵇ is positioned a hollow annular baffle shell 25ª having baffle walls regularly spaced by webbing 25ᶜ from the opposed walls of the fairing shell, the space between the fairing shell 25ᵇ and the baffle shell 25ª providing a continuous circulation passage 26.

A distribution chamber 27, bounded by the fairing 25 and the bulkhead 28, is connected to the conduits 14 in the leading edges of the struts 13. A conduit or duct 29, connected to the bulkhead 28, leads from some source, such as a heat exchanger or other portion of the engine, from which hot air or other gases may be driven. Encircling the intake passage or duct a continuous annular slot 30 is formed in the intake wall of the fairing shell 25ᵇ, the opening being arranged so as to face toward the compressor.

In the operation of the anti-icing system, suitable hot air is introduced through duct 29 to the chamber 27. The various arrangements for supplying the hot air are not important to this invention, and have not been illustrated. Some of the hot air which is introduced flows from the chamber 27 through the circulation passage 26 within the fairing 25 and escapes from the annular slot 30. The slot 30 is so situated that the air escaping from it must pass through the circulation passage 26 and heat from within the outer surface of the fairing shell 25ᵇ. A portion of the intake wall of the fairing shell 25ᵇ is bent outwardly adjacent to the slot 30 to provide a deflector 31 for the issuing air. In escaping from the slot 30, the air consequently is directed toward the compressor and clings closely to the intake wall as it passes into the compressor with the main air stream through the intake duct formed by the annular fairing 25 and the nose bullet 16.

Another part of the hot air in the chamber 27 flows through the leading edges 14 of the struts 13 and thence into the circulation passage 17 under the skin of the central fairing or nose bullet. This air will eventually escape from the slot 20 and be directed toward the compressor by the edge portion of the cap 18, which acts as a deflector for the issuing air, which will then flow along the outer surface of the nose bullet 16, clinging closely to its surface, as it is carried along by the main flow into the compressor.

In the circulation of hot air under the shell of the outer intake fairing, the struts, and the nose bullet, the transfer of heat is dependent not only upon the local temperature of the hot air, but also on its local velocity; by a choice of the size of conduits and circulation passages, the velocity of the flow of the hot air can be arranged to suit the transfer of heat required at any particular point. By this means distribution of heat can be arranged at will to meet the distribution of possible ice formation which is in general most serious on the tip of the nose bullet 16 and the forward face of the fairing 25. Furthermore in escaping through the slots 20 and 30 the exhaust air aids in the prevention of ice formation by film heating. In this connection, attention is directed to the analogy of film cooling which operates effectively over the flame tubes of gas turbine combustion chambers under conditions of much greater turbulence than exist in the air intake.

The volume of hot air escaping from the slots 20 and 30 will be very small in proportion to the volume of the air flowing into the compressor and will not materially raise the temperature thereof. Furthermore, it will be of no serious consequence if a certain amount of leakage occurs at the seal 22 and seat 23 or anywhere else in the system.

It is to be understood that the form of the invention, herewith shown and described, is to be taken as a preferred example of the same, and that various changes in the shape, size and arrangement of the parts may be resorted to, without departing from the spirit of the invention or the scope of the claims.

What I claim as my invention is:

1. Heated intake components for a gas turbine engine comprising an annular fairing including a hollow annular fairing shell provided by a cowling wall and an intake wall which converge towards each other and curve and blend into each other at the front, a hollow annular baffle shell disposed within the fairing shell and having baffle walls regularly spaced from the opposed cowling and intake walls of the fairing shell, an annular distribution chamber within the fairing shell and adjacent the baffle shell, the space between the baffle walls and the opposed cowling and intake walls providing a continuous circulation passage communicating with the distribution chamber, a central fairing disposed substantially coaxially with respect to the annular fairing shell and spaced from the intake wall, the central fairing having a double wall comprising a duct wall and another baffle wall spaced from the duct wall, the duct wall and the other baffle wall providing another circulation passage within the double wall of the central fairing, the duct wall of the central fairing defining with the intake wall of the annular fairing an annular intake duct by which air is guided into the engine, a source of hot gases, a conduit for introducing the hot gases into the distribution chamber, conduits for conveying the hot gases from the distribution chamber to the said other circulation passage, and continuous annular outlets in the intake wall and in the duct wall for discharging the hot gases into the intake duct.

2. Heated intake components for a gas turbine engine comprising a hollow intake fairing including a hollow fairing shell provided by a cowling wall exposed to the airflow around the engine and an intake wall defining an intake duct and exposed to the main airstream entering the engine, and a hollow baffle shell disposed within the fairing shell and having baffle walls regularly spaced from the opposed cowling and intake walls of the fairing shell, webbing between the fairing shell and the baffle shell and supporting the baffle shell within the fairing shell, an annular distribution chamber within the fairing shell and adjacent the baffle shell, the space between the baffle walls and the opposed cowling and intake walls providing a continuous circulation passage communicating with the distribution chamber, a source of hot gases, a conduit for introducing the hot gases into the distribution chamber, and a continuous annular outlet in the intake wall at the forward end thereof for discharging the hot gases into the intake duct.

3. Heated intake components for a gas turbine engine comprising an annular bulkhead at the front of the engine, an annular fairing including a hollow annular fairing shell provided by a cowling wall extending forwardly from the outer diameter of the bulkhead and an intake wall extending forwardly from the inner diameter of the bulkhead, which walls converge towards each other and curve and blend into each other at the front, a hollow annular baffle shell disposed within the fairing shell and having baffle walls regularly spaced from the opposed cowling and intake walls of the fairing shell, the baffle walls terminating rearwardly in a plane spaced from the bulkhead, webbing between the fairing shell and baffle shell and supporting the baffle shell within the fairing shell, the space between the baffle shell and the bulkhead providing a distribution chamber, the space between the baffle walls and the opposed cowling and intake walls providing a continuous circulation passage communicating with the distribution chamber, a source of hot gases, a conduit for introducing the hot gases through the bulkhead into the distribution chamber, and a continuous annular outlet in the intake wall at a point remote from the annular bulkhead for discharging the hot gases.

4. Heated intake components for a gas turbine engine comprising an annular bulkhead at the front of the engine, an annular fairing including a hollow annular fairing shell provided by a cowling wall extending forwardly from the outer diameter of the bulkhead and an intake wall extending forwardly from the inner diameter of the bulkhead, which walls converge towards each other and curve and blend into each other at the front, a hollow annular baffle shell disposed within the fairing shell and having baffle walls regularly spaced from the opposed cowling and intake walls of the fairing shell, the baffle walls terminating rearwardly in a plane spaced from the bulkhead, webbing between the fairing shell and baffle shell and supporting the baffle shell within the fairing shell, the space between the baffle shell and the bulkhead providing a distribution chamber, the space between the baffle walls and the opposed cowling and intake walls providing a continuous circulation passage communicating with the distribution chamber, a central fairing disposed substantially coaxially with respect to the annular fairing shell and spaced from the intake wall, the central fairing having a double wall comprising a duct wall and another baffle wall spaced from the duct wall, the duct wall and the other baffle wall providing another circulation passage within the double wall of the central fairing, the duct wall of the central fairing defining with the intake wall of the annular fairing an annular intake duct by which air is guided into the engine, a source of hot gases, a conduit for introducing the hot gases through the bulkhead into the distribution chamber, hollow struts extending radially from the intake wall to the duct wall and connecting the distribution chamber with the said other circulation passage, and continuous annular outlets in the intake wall and in the duct wall at locations remote from the engine for discharging the hot gases into the intake duct.

5. Heated intake components for a gas turbine engine comprising an annular fairing extending forwardly of the engine and defined by a double wall, the double wall including spaced-apart opposing walls defining a circulation passage between the walls, a central fairing disposed substantially coaxially with respect to the annular fairing and spaced from the double wall, the sides of the central fairing being defined by a removable double wall including spaced-apart opposing walls defining another circulation passage between the walls of the central fairing, the central fairing having a nose cap removably secured to the engine, the cap having an annular shoulder engaging the front edge of one wall of the central fairing to secure the double wall of the central fairing to the engine, the nose cap being spaced from the other wall of the central fairing and providing a continuous annular outlet from the said other circulation passage, and conduits for introducing the hot gases into the first-mentioned circulation passage and for conveying the hot gases to the said other circulation passage, at least part of the hot gases being discharged from the annular outlet.

6. Heated intake components for a gas turbine engine comprising an annular fairing extending forwardly of the engine and defined by a double wall, the double wall comprising spaced-apart opposing walls defining a circulation passage between the walls, a central fairing disposed substantially coaxially with respect to the annular fairing and spaced from the double wall to define with the double wall an annular intake duct by which air is guided into the engine, the central fairing being defined by a removable double wall comprising a duct wall and a baffle wall spaced from the duct wall, the duct wall and the baffle wall providing another circulation passage within the double wall of the central fairing, the central fairing, having a nose cap removably secured to the engine, the cap having an annular shoulder engaging the front edge of the baffle wall of the central fairing to secure the double wall of the central fairing to the engine, the nose cap also having a substantially circular edge spaced from the duct wall of the central fairing and providing a continuous annular outlet from the said other circulation passage, the circular edge of the nose cap extending toward the engine beyond the front edge of the duct wall to provide a deflector, a source of hot gases, and conduits for introducing the hot gases into the first-mentioned circulation pasage and for conveying the hot gases to the said other circulation passage, at least part of the hot gases being discharged from the annular outlet and deflected by the deflector over the surface of the duct wall between the air entering the compressor and the duct wall.

WINNETT BOYD.

REFERENCES CITED

The following references are of record in the file of this patent:

UNITED STATES PATENTS

| Number | Name | Date |
|---|---|---|
| 2,318,233 | Keller | May 4, 1943 |
| 2,482,720 | Sammons | Sept. 20, 1949 |

FOREIGN PATENTS

| Number | Country | Date |
|---|---|---|
| 102,209 | Sweden | July 29, 1941 |
| 871,408 | France | Apr. 8, 1941 |